(12) United States Patent
Nedwed et al.

(10) Patent No.: US 11,905,813 B2
(45) Date of Patent: Feb. 20, 2024

(54) HYDRAULIC FRACTURING WITH DENSITY-TUNABLE HEAVY FRACTURING FLUIDS

(71) Applicant: ExxonMobil Technology and Engineering Company, Spring, TX (US)

(72) Inventors: Timothy J. Nedwed, Houston, TX (US); Dragan Stojkovic, Spring, TX (US); Lee J. Hall, The Woodlands, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 18/055,206

(22) Filed: Nov. 14, 2022

(65) Prior Publication Data

US 2023/0175377 A1 Jun. 8, 2023

Related U.S. Application Data

(60) Provisional application No. 63/264,964, filed on Dec. 6, 2021.

(51) Int. Cl.
*E21B 43/267* (2006.01)
*C09K 8/64* (2006.01)
*C09K 8/66* (2006.01)
*C09K 8/80* (2006.01)

(52) U.S. Cl.
CPC .............. *E21B 43/267* (2013.01); *C09K 8/64* (2013.01); *C09K 8/665* (2013.01); *C09K 8/80* (2013.01)

(58) Field of Classification Search
None
See application file for complete search history.

(56) References Cited

U.S. PATENT DOCUMENTS

| | | | |
|---|---|---|---|
| 2005/0274523 A1 | 12/2005 | Brannon et al. | |
| 2012/0043080 A1 | 2/2012 | Edwards | |
| 2014/0209390 A1* | 7/2014 | Jamison | E21B 7/00 175/213 |
| 2019/0241789 A1* | 8/2019 | Agapiou | C09K 8/905 |
| 2020/0165909 A1 | 5/2020 | Cook | |

* cited by examiner

*Primary Examiner* — Andrew Sue-Ako
(74) *Attorney, Agent, or Firm* — ExxonMobil Technology and Engineering Company—Law Departments

(57) ABSTRACT

A slurry including a density-tunable heavy fracturing fluid and a method for completing a hydrocarbon well using such a slurry are provided herein. The slurry includes a proppant and the density-tunable heavy fracturing fluid, where the density-tunable heavy fracturing fluid includes a pseudo heavy fluid suspension, a concentrated aqueous solution of a soluble heavy compound, and/or a high-density organic solution. The density of the density-tunable heavy fracturing fluid is between 1.25 grams/milliliter (g/ml) and 3.4 g/ml. Moreover, the density of the density-tunable heavy fracturing fluid is selected based on the density of the proppant. According to the method provided herein, the slurry is used to provide for more effective placement of the proppant within the fractures than can be achieved using only a slurry including conventional fracturing fluid and the proppant.

12 Claims, 3 Drawing Sheets

HYDRAULIC FRACTURING WITH DENSITY-TUNABLE HEAVY FRACTURING FLUIDS

CROSS-REFERENCE TO RELATED APPLICATION

This application claims the benefit of U.S. Provisional Application Ser. No. 63/264,964, entitled "HYDRAULIC FRACTURING WITH DENSITY-TUNABLE HEAVY FRACTURING FLUIDS", filed Dec. 6, 2021, the disclosure of which is hereby incorporated by reference in its entirety.

FIELD OF THE INVENTION

The techniques described herein relate to the field of hydrocarbon well completions and hydraulic fracturing operations. More specifically, the techniques described herein relate to density-tunable heavy fracturing fluids and methods for utilizing such fracturing fluids during hydraulic fracturing operations.

BACKGROUND OF THE INVENTION

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

A wellbore is drilled into a subterranean formation to promote the removal (or production) of a hydrocarbon resource from a hydrocarbon-bearing interval (or reservoir) of the formation. In many cases, the subterranean formation needs to be stimulated in some manner to promote the removal of the hydrocarbon resource. Stimulation operations include any operation performed on the matrix of the subterranean formation to improve hydraulic conductivity within the matrix. Such stimulation operations include hydraulic fracturing operations, which are commonly used to stimulate unconventional reservoirs.

Hydraulic fracturing operations involve pumping large quantities of fracturing fluid into the subterranean formation under high hydraulic pressure to promote the formation of fractures within the matrix of the subterranean formation. Next, a slurry including both fracturing fluid and proppant is pumped into the fractures to prop the fractures with the proppant after the hydraulic pressure has been released following the hydraulic fracturing operation. More specifically, upon reaching the fractures, the proppant settles within the fractures to form a proppant pack that prevents the fractures from closing once the hydraulic pressure has been released. In this manner, the proppant provides a long-term increase in fluid permeability within the fractured region of the formation.

In operation, the success of the hydraulic fracturing process has a direct impact on the amount of hydrocarbon fluids that can be recovered from the reservoir. Specifically, the numbers, sizes, compliances, and locations of the fractures corresponding to the perforation clusters within each stage of the hydrocarbon well directly impact the amount of hydrocarbon fluids that are able to mobilize and flow into the wellbore. Ideally, each perforation cluster within a particular stage leads to a single long, complex fracture, thus maximizing the propped fracture surface area using a given amount of resources in terms of pumping horsepower and fracturing fluid materials.

However, in reality, conventional fracturing fluid materials do not effectively maximize the propped fracture surface area. In particular, conventional proppants, which are commonly formed from sand and/or ceramic particles, tend to settle quickly within a near-perforation region of the fractures, thus accumulating within close proximity to the wellbore and leaving much of the extended region of the fractures unpropped. This, in turn, results in limited production from the resulting low-conductivity, partly-unpropped fractures. Moreover, as a result, larger quantities of proppant and fracturing fluid are required to push the proppant as far into the fractures as possible.

This problem is caused, at least in part, by the high settling velocity of conventional proppants within conventional fracturing fluids, where such settling velocity is directly correlated to the density difference between the proppant and the fracturing fluid. Specifically, a higher density difference between the proppant and the fracturing fluid results in a higher settling velocity for the proppant. Take as an example a conventional proppant formed from sand, which has a density of around 2.65 grams/milliliter (g/ml) and a conventional fracturing fluid composed primarily of brine, which has a density of between around 1.0 g/ml to around 1.2 g/ml. This high density difference causes the proppant to have a high settling velocity within the fracturing fluid; and, as a result, the proppant will settle quickly within the fractures.

One technique for addressing this problem is to reduce the particle size of the sand (or other granular material) that is used for the proppant. However, smaller sand particle sizes result in lower porosities and permeabilities within the resulting proppant packs. As a result, there is a practical lower limit for the sand particle size.

Another technique is to utilize unconventional, lightweight (or low-density) proppants. The goal of this technique is to reduce the settling velocity of the proppant within the fracturing fluid by reducing the density difference between the proppant and the fracturing fluid. However, such lightweight proppants are generally more expensive than conventional proppants. Moreover, such lightweight proppants have the potential to negatively impact the porosity and/or permeability of the proppant packs after months and years of being soaked with hydrocarbons.

Yet another technique is to increase the viscosity of the fracturing fluid. This can be accomplished using gels, for example. However, such gels have the potential to negatively impact the permeability of both the rock faces and the proppant packs.

SUMMARY OF THE INVENTION

An embodiment described herein provides a method for completing a hydrocarbon well using a density-tunable heavy fracturing fluid. The method includes positioning a perforation device within a tubular conduit of a downhole tubular extending through a wellbore within a subsurface region and perforating the downhole tubular using the perforation device to define perforations within the downhole tubular. The method includes pumping a conventional fracturing fluid into the tubular conduit to fracture areas of the subsurface region that are proximate to the perforations, forming corresponding fractures within the subsurface region. The method also includes flowing a slurry including the conventional fracturing fluid and a proppant into the fractures, via the perforations, to prop the fractures with the proppant and flowing a slurry including a density-tunable heavy fracturing fluid and the proppant into the fractures, via the perforations, to further prop the fractures with the proppant. In the method, the density-tunable heavy fracturing fluid includes a pseudo heavy fluid suspension, a concentrated aqueous solution of one or more soluble heavy compounds, and/or a high-density organic solution, and the density of the density-tunable heavy fracturing fluid is higher than the density of the conventional fracturing fluid. The method further includes returning a slurry including the density-tunable heavy fracturing fluid and the conventional fracturing fluid to a wellhead of the wellbore and recovering at least a portion of the density-tunable heavy fracturing fluid from the slurry.

Another embodiment described herein provides a slurry for propping fractures within a subsurface region. The slurry includes a proppant and a density-tunable heavy fracturing fluid. The density-tunable heavy fracturing fluid includes a pseudo heavy fluid suspension, a concentrated aqueous solution of one or more soluble heavy compounds, and/or a high-density organic solution. The density of the density-tunable heavy fracturing fluid is between 1.25 grams/milliliter (g/ml) and 3.4 g/ml. Moreover, the density of the density-tunable heavy fracturing fluid is selected based on the density of the proppant.

These and other features and attributes of the disclosed embodiments of the present techniques and their advantageous applications and/or uses will be apparent from the detailed description that follows.

BRIEF DESCRIPTION OF THE DRAWINGS

To assist those of ordinary skill in the relevant art in making and using the subject matter described herein, reference is made to the appended drawings.

Figure 1:
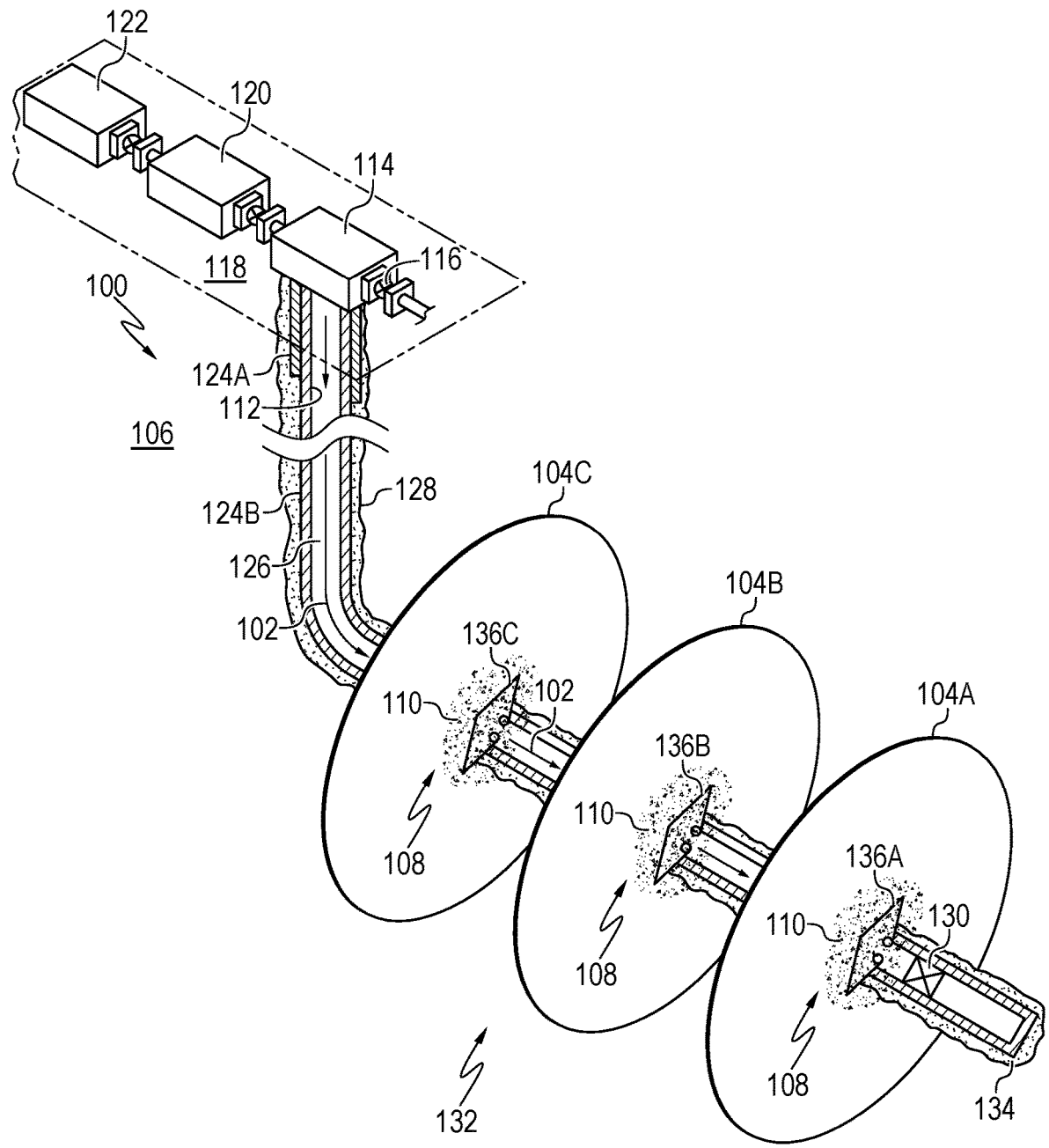
FIG. 1 is a schematic view of an exemplary hydrocarbon well that is completed using the density-tunable heavy fracturing fluid described herein.

It should be noted that the figures are merely examples of the present techniques and are not intended to impose limitations on the scope of the present techniques. Further, the figures are generally not drawn to scale, but are drafted for purposes of convenience and clarity in illustrating various aspects of the techniques.

DETAILED DESCRIPTION OF THE INVENTION

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

Terminology

At the outset, and for ease of reference, certain terms used in this application and their meanings as used in this context are set forth. To the extent a term used herein is not defined below, it should be given the broadest definition those skilled in the art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the singular forms "a," "an," and "the" mean one or more when applied to any embodiment described herein. The use of "a," "an," and/or "the" does not limit the meaning to a single feature unless such a limit is specifically stated.

The terms "about" and "around" mean a relative amount of a material or characteristic that is sufficient to provide the intended effect. The exact degree of deviation allowable in some cases may depend on the specific context, e.g., ±1%, ±5%, ±10%, ±15%, etc. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "any" means one, some, or all of a specified entity or group of entities, indiscriminately of the quantity.

The phrase "at least one," in reference to a list of one or more entities, should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A or B" (or, equivalently, "at least one of A and B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase "based on" does not mean "based only on," unless expressly specified otherwise. In other words, the phrase "based on" means "based only on," "based at least on," and/or "based at least in part on."

As used herein, the terms "example," exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure, or method is not intended to be limiting, required, or exclusive/exhaustive; and other components, features, structures, or methods, including structurally and/or functionally similar and/or equivalent components, features, structures, or methods, are also within the scope of the present techniques.

As used herein, the term "fluid" refers to gases and liquids, as well as to combinations of gases and liquids, combinations of gases and solids, combinations of liquids and solids, and combinations of gases, liquids, and solids.

The use of the noun "fracture" refers to a crack or surface of breakage induced by an applied pressure or stress within a subsurface formation.

The use of the verb "fracture" means to perform a stimulation treatment, such as a hydraulic fracturing treatment, which is routine for hydrocarbon wells in low-permeability reservoirs. Specially-engineered fracturing fluids are pumped at high pressures and rates into the reservoir interval to be treated, causing fractures to open. The wings of the fractures extend away from the wellbore in opposing directions according to the natural stresses within the formation. The characteristics of different fractures and fracture networks have a significant impact on a reservoir's production capability.

The term "fracturing fluid" generally refers to a fluid that is injected into a hydrocarbon well as part of a stimulation operation. More specifically, the term "conventional fracturing fluid" is used herein to refer to slickwater or any other commercially-available fracturing fluid with a density of 1.2 g/ml or less. Slickwater is one of the most commonly-used fracturing fluids and is mostly water with a small amount, i.e., around 1%, of friction reducers and other fluids (usually shear thinning, non-Newtonian solutions, gels, or emulsions). The friction reducers and other fluids allow for a faster pumping rate into a reservoir, leading to an increase in the numbers and sizes of the fractures formed.

As used herein, the term "hydraulic conductivity" refers to the ability of a fluid within a formation to pass through a fracture including proppant at various stress (or pressure) levels, which is based, at least in part, on the permeability of the proppant deposited within the fractures.

The term "hydraulic fracturing" refers to a process for creating fractures that extend from a wellbore into a reservoir, so as to stimulate the flow of hydrocarbon fluids from the reservoir into the wellbore. A fracturing fluid is generally injected into the reservoir with sufficient pressure to create and extend multiple fractures within the reservoir, and a proppant material is used to "prop" or hold open the fractures after the hydraulic pressure used to generate the fractures has been released.

A "hydrocarbon" is an organic compound that primarily includes the elements hydrogen and carbon, although nitrogen, sulfur, oxygen, metals, or any number of other elements may be present in small amounts. As used herein, the term "hydrocarbon" generally refers to components found in natural gas, oil, or chemical processing facilities. Moreover, the term "hydrocarbon" may refer to components found in raw natural gas, such as $CH_4$, $C_2H_6$, $C_3$ isomers, $C_4$ isomers, benzene, and the like.

As used herein, the term "proppant" refers to any suitable material that is capable of maintaining open an induced fracture within a formation during and following a hydraulic fracturing treatment for a corresponding wellbore.

"Subterranean formation" (also referred to as "subsurface formation" or simply "formation") refers to a subsurface region including an aggregation of subsurface sedimentary, metamorphic and/or igneous matter, whether consolidated or unconsolidated, and other subsurface matter, whether in a solid, semi-solid, liquid and/or gaseous state, related to the geological development of the subsurface region. A formation can be a body of geologic strata of predominantly one type of rock or a combination of types of rock, or a fraction of strata having substantially common sets of characteristics. A formation can contain one or more hydrocarbon-bearing intervals, generally referred to as "reservoirs." Note that the terms "formation," "reservoir," and "interval" may be used interchangeably, but may generally be used to denote progressively smaller subsurface regions, stages, or volumes. More specifically, a "formation" may generally be the largest subsurface region, while a "reservoir" may generally be a hydrocarbon-bearing stage or interval within the geologic formation that includes a relatively high percentage of oil and gas. Moreover, an "interval" may generally be a sub-region or portion of a reservoir. In some cases, a hydrocarbon-bearing stage, or reservoir, may be separated from other hydrocarbon-bearing stages by stages of lower permeability, such as mudstones, shales, or shale-like (i.e., highly-compacted) sands.

In addition, the term "near-perforation region," when used in reference to a fracture within a subsurface region, refers to a portion of the fracture that is within close proximity to the corresponding perforation(s), such as, for example, within 5 feet, within 10 feet, within 15 feet, or within 20 feet of the perforation(s). In addition, the term "near-perforation region" may also refer to the actual perforations (or perforation tunnels) corresponding to the fracture.

Furthermore, the term "extended region," when used in reference to a fracture within a subsurface region, refers to a portion of the fracture that is beyond the near-perforation region, such as the region beginning around 20 to around 50 feet from the corresponding perforation(s) and extending substantially the entire length of the fracture (or some substantial portion thereof, such as, for example, around 70% to around 90% of the total length of the fracture).

As used herein, the term "surface" refers to the uppermost land surface of a land well, or the mud line of an offshore well, while the term "subsurface" (or "subterranean") generally refers to a geologic strata occurring below the earth's surface. Moreover, as used herein, "surface" and "subsurface" are relative terms. The fact that a particular piece of equipment is described as being on the surface does not necessarily mean it must be physically above the surface of the earth but, rather, describes only the relative placement of the surface and subsurface pieces of equipment. In that sense, the term "surface" may generally refer to any equipment that is located above the casing strings and other equipment that is located inside the wellbore. Moreover, according to embodiments described herein, the terms "downhole" and "subsurface" are sometimes used interchangeably, although the term "downhole" is generally used to refer specifically to the inside of the wellbore.

The term "substantially," when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

The term "wellbore" refers to a borehole drilled into a subterranean formation. The borehole may include vertical, deviated, highly deviated, and/or horizontal sections. The term "wellbore" also includes the downhole equipment associated with the borehole, such as the casing strings, production tubing, gas lift valves, and other subsurface equipment. Relatedly, the term "hydrocarbon well" (or simply "well") includes the wellbore in addition to the wellhead and other associated surface equipment.

Certain embodiments and features are described herein using a set of numerical upper limits and a set of numerical lower limits. It should be appreciated that ranges from any lower limit to any upper limit are contemplated unless otherwise indicated. All numerical values are "about" or "approximately" the indicated value, and account for experimental errors and variations that would be expected by those skilled in the art.

Furthermore, concentrations, dimensions, amounts, and/or other numerical data that are presented in a range format are to be interpreted flexibly to include not only the numerical values explicitly recited as the limits of the range, but also all individual numerical values or sub-ranges encompassed within that range, as if each numerical value and sub-range were explicitly recited. For example, a disclosed numerical range of 1 to 200 should be interpreted to include, not only the explicitly-recited limits of 1 and 200, but also individual values, such as 2, 3, 4, 197, 198, 199, etc., as well as sub-ranges, such as 10 to 50, 20 to 100, etc.

As described above, conventional techniques for propping fractures with proppant during hydraulic fracturing operations are not highly effective at propping extended regions of the fractures while also maintaining high porosity and permeability within the resulting proppant packs. Accordingly, embodiments described herein provide a novel fracturing fluid (referred to herein as a "density-tunable heavy fracturing fluid") including includes a pseudo heavy fluid suspension, a concentrated aqueous solution of one or more soluble heavy compounds, and/or a high-density organic solution, as well as techniques for utilizing such fracturing fluid during hydraulic fracturing operations to provide for effective placement of proppant within the extended regions of the fractures while still maintaining high porosity and permeability within the resulting proppant packs. As described further herein, this is achieved, at least in part, by selecting the density of the density-tunable heavy fracturing fluid based on the density of the proppant and then adjusting the density of the density-tunable heavy fracturing fluid to achieve a specified settling velocity for the proppant within the slurry.

The hydraulic fracturing techniques described herein, which utilize the novel density-tunable heavy fracturing fluid described herein during at least a portion of the hydraulic fracturing process, provide a number of advantages over conventional hydraulic fracturing techniques, which utilize lighter-weight fracturing fluid during the entire hydraulic fracturing process. As an example, the techniques described herein increase fracture productivity by ensuring that the entire fractured region (or at least a substantial portion thereof) is packed with proppant. As another example, the techniques described herein enable conventional proppants including sand to be used for the hydraulic fracturing process. This is advantageous because sand is not only inexpensive but is also proven to provide proppant packs that maintain high porosity and permeability characteristics over the effective life of a typical wellbore. As another example, the techniques described herein enable sand (or other proppants) with larger particle sizes to be used, which is more cost-effective and will also further increase the porosities and permeabilities of the resulting proppant packs. As another example, the techniques described herein reduce the total amount of proppant that is needed to prop the fractures since the proppant is more effectively and evenly distributed throughout the fractures. As yet another example, the techniques described herein reduce the total amount of fracturing fluid that is needed to set the same propped area, thus further increasing the efficiency and cost-effectiveness of the overall hydraulic fracturing process.

Exemplary Hydrocarbon Well Completed Using Density-Tunable Heavy Fracturing Fluid FIG. 1 is a schematic view of an exemplary hydrocarbon well 100 that is completed using the density-tunable heavy fracturing fluid described herein. In particular, FIG. 1 illustrates the hydrocarbon well 100 during an initial stage of the hydraulic fracturing operation, during which a conventional fracturing fluid, as indicated by arrow 102, is used to generate fractures 104 within a subsurface region 106 including a hydrocarbon-bearing subterranean formation (or reservoir) and to partially prop a near-perforation region 108 of the fractures 104 with proppant 110.

As shown in FIG. 1, the exemplary hydrocarbon well 100 includes a wellbore 112 that extends within the subsurface region 106 including the hydrocarbon-bearing subterranean formation (or reservoir). In some embodiments, the subterranean formation is an unconventional formation, such as a formation including, but not limited to, tight sandstone, shale, clay-rich mudstone, sand-rich mudstone, carbonate, and/or siliciclastic mudstone. The hydrocarbon well 100 also includes a wellhead 114 including (among other components) a shut-in valve 116 that controls the flow of hydrocarbon fluids from the subsurface region 106 to a surface region 118. In various embodiments, the wellhead 114 is physically and fluidically coupled to a fracturing fluid supply system 120 and a fracturing fluid recovery system 122, as described further with respect to FIG. 2.

The hydrocarbon well 100 is completed by setting a series of tubulars into the wellbore 112. These tubulars include several strings of casing, such as a surface casing string 124A and a production casing string 124B, as shown in FIG. 1, which define a tubular conduit 126 that provides a flow path for the hydrocarbon fluids to flow from the subsurface region 106 to the surface region 118. In some embodiments, additional intermediate casing strings (not shown) are also included to provide support for the walls of the wellbore 112. According to the embodiment shown in FIG. 1, the surface casing string 124A and the production casing string 124B are both hung from the surface. However, in some embodiments, the surface casing string 124A is hung from the surface, while the production casing string 124B (sometimes referred to as a "production liner") is hung from the bottom of a preceding casing string (e.g., an intermediate casing string) using a liner hanger (not shown).

In various embodiments, the surface casing string 124A and the production casing string 124B (as well any intermediate casing strings) are set in place using cement 128. The cement 128 isolates the intervals of the subterranean formation from the wellbore 112 and each other. Alternatively, the wellbore 112 is set as an open-hole completion, meaning that the production casing string 124B (or production liner) is not set in place using cement.

In some embodiments, the subterranean formation surrounding the wellbore 112 is hydraulically fractured via a plug-and-perforation (or "plug-and-perf") process (or other suitable multistage hydraulic fracturing process). To implement this plug-and-perf process, a bottomhole assembly (BHA) (not shown) including perforating guns (not shown), a fracturing plug (or "frac plug") 130, and a setting tool (not shown) is run to a desired depth or zone within the wellbore 112, where the desired depth or zone corresponds to a specific stage 132 of the hydrocarbon well 100. Once the desired depth or zone is reached, the setting tool is used to set the frac plug 130 against the inner diameter of the production casing string 124B, as shown with respect to the stage 132 depicted in the simplified schematic view of FIG. 1, which is the stage closest to a toe 134 of the wellbore 112. Moreover, once the frac plug 130 has been set within the production casing string 124B, the perforating guns are detonated to create clusters of perforations 136A, 136B, and 136C through the production casing string 124B and the surrounding cement 128.

The plug-and-perf assembly is then removed from the wellbore 112, and a conventional fracturing fluid is pumped down the wellbore 112, through the clusters of perforations 136A, 136B, and 136C, and into the surrounding formation, forming corresponding fractures 104A, 104B, and 104C within the formation. Next, a slurry of the conventional fracturing fluid and the proppant 110 is pumped down the wellbore 112, as indicated by the arrow 102, such that the proppant 110 is positioned within the near-perforation region 108 of each fracture 104A, 104B, and 104C, with the effective reach and/or depth of the proppant 110 varying based on the conditions within the fractures 104A, 104B, and 104C. In this manner, the proppant 110 serves to hold the near-perforation region of the fractures 104A, 104B, and 104C open after the hydraulic pressure is released.

According to embodiments described herein, the conventional proppant may include slickwater or any other suitable fracturing fluid that is commercially available. In addition, the proppant 110 may include a conventional proppant, such as sand, crushed granite, ceramic beads, and/or other granular materials. Additionally or alternatively, the proppant 110 may include an unconventional, lightweight proppant, such as a proppant including petroleum coke particles, polyolefins, and/or polyaromatic hydrocarbon resins.

In various embodiments, this plug-and-perf process is used to perforate and fracture a number of additional stages (not shown) corresponding to the horizontal portion of the wellbore 112, thus forming a number of corresponding perforation clusters and fractures. However, in many cases, difficulties are encountered during the hydraulic fracturing process. In particular, as shown schematically in FIG. 1, the proppant 110 tends to deposit (or settle) within the near-perforation region 108 of the fractures 104A, 104B, and 104C, which is the area of the fractures 104A, 104B, and 104C that is in relatively close proximity to the corresponding perforations and/or within the perforation tunnels themselves. As described herein, this problem is caused, at least in part, by the high settling velocity of the proppant 110 within conventional fracturing fluid, where such settling velocity is directly correlated to the density difference between the proppant 110 and the fracturing fluid, with a higher density difference between the proppant 110 and the fracturing fluid resulting in a higher settling velocity for the proppant 110. Moreover, such settling of the proppant 110 within primarily the near-perforation region 108 of the formation prevents the hydraulic fracturing process from effectively maximizing the propped fracture surface area, thus resulting in limited production from the resulting low-conductivity, partly-unpropped fractures 104A, 104B, and 104C.

Figure 2:
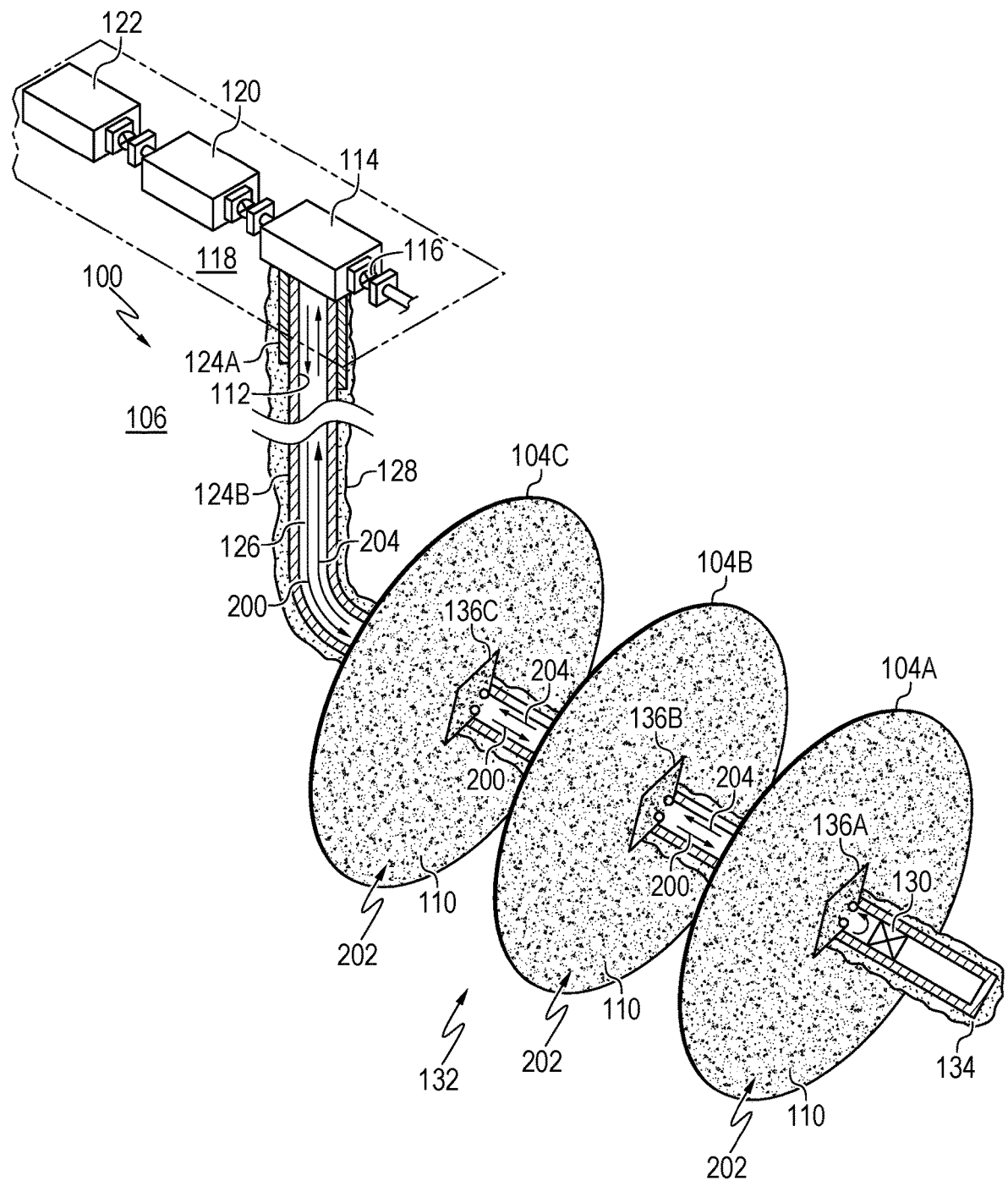
FIG. 2 is another schematic view of the exemplary hydrocarbon well of FIG. 1, which is completed using the density-tunable heavy fracturing fluid described herein.

Therefore, according to embodiments described herein, a novel density-tunable heavy fracturing fluid is used to increase the effectiveness of the hydraulic fracturing process. In particular, FIG. 2 is another schematic view of the exemplary hydrocarbon well 100 of FIG. 1, which is completed using the density-tunable heavy fracturing fluid described herein. In particular, FIG. 2 illustrates the exemplary stage 132 of the hydrocarbon well 100 during a final part of the hydraulic fracturing operation for the particular stage 132, during which a slurry including the density-tunable heavy fracturing fluid and proppant is flowed into the wellbore 112, as indicated by arrow 200, and used to further prop both the near-perforation region 108 and an extended region 202 of the fractures 104A, 104B, and 104C with the proppant 110. Those skilled in the art will appreciate that, while the density-tunable heavy fracturing fluid is described as providing for the effective propping of the extended region 202 of the fractures 104A, 104B, and 104C, the effective reach and/or depth of the proppant 110 will vary based on the conditions within the fractures 104A, 104B, and 104C. In general, the utilization of the density-tunable heavy fracturing fluid may enable the deposition of the proppant 110 within substantially the entire length of each fracture 104A, 104B, and 104C or some substantial portion thereof, such as, for example, around 70% to around 90% of the total length of each fracture 104A, 104B, and 104C.

In various embodiments, the hydrocarbon well 100 also includes the fracturing fluid supply system 120 for providing the slurries including the conventional fracturing fluid and the density-tunable heavy fracturing fluid to the subsurface region 106 via the tubular conduit 126 corresponding to the production casing string 124B. Specifically, in the embodiment shown in FIG. 2, the fracturing fluid supply system 120 provides the density-tunable heavy fracturing fluid to the wellhead 114, and the wellhead 114 then provides the density-tunable heavy fracturing fluid to the tubular conduit 126. However, in other embodiments, the fracturing fluid supply system 120 provides the density-tunable heavy fracturing fluid directly to the tubular conduit 126. Moreover, once the density-tunable heavy fracturing fluid has been provided to the tubular conduit 126, the density-tunable heavy fracturing fluid flows to the perforations 136A, 136B, and 136C and into the near-perforation region of the corresponding fractures 104A, 104B, and 104C, as indicated by the arrow 200.

In some embodiments, the fracturing fluid supply system 120 includes a pseudo heavy fluid supply tank (not shown) for storing one or more pseudo heavy fluid suspensions, an aqueous solution supply tank for storing one or more concentrated aqueous solutions of one or more soluble heavy compounds, and/or an organic solution supply tank for storing one or more high-density organic solutions. In addition, the fracturing fluid supply system may include a proppant storage tank for storing one or more types of proppant. In such embodiments, the fracturing fluid supply system 120 is configured to blend or mix the pseudo heavy fluid suspension(s), concentrated aqueous solution(s) of soluble heavy compound(s), high-density organic solution(s), and/or the proppant(s) to form suitable slurries to be used for the embodiments described herein. In particular, the fracturing fluid supply system 120 may be configured to blend or mix such components to provide density-tunable heavy fracturing fluid with a specified density. In various embodiments, the specified density of the density-tunable heavy fracturing fluid is between 1.25 g/ml and 3.4 g/ml. Moreover, in various embodiments, the density of the density-tunable heavy fracturing fluid is specifically selected based on the density of the proppant. In some embodiments, the density of the density-tunable heavy fracturing fluid may then be adjusted as the hydraulic fracturing operation progresses to achieve a specified settling velocity for the proppant within the slurry, where such specified settling velocity may be determined (and then intermittently modified) to ensure substantially even placement of the proppant within both the near-perforation and extended regions of the fractures. For example, the density of the density-tunable heavy fracturing fluid may be selected to be within 1.5 g/ml of the density of the proppant, within 1.0 g/ml of the density of the proppant, or within 0.5 g/ml of the density of the proppant, depending on the details of the particular implementation. Moreover, in some embodiments, the density of the density-tunable heavy fracturing fluid is gradually increased to encourage the proppant to settle further and further from the wellbore within the extended region of the fractures.

In addition, in some embodiments, the fracturing fluid supply system 120 also includes one or more fracturing fluid supply conduits (not shown) that are configured to separately provide the conventional fracturing fluid and the density-tunable heavy fracturing fluid to the subsurface region 106 via the tubular conduit 126. In some such embodiments, the fracturing fluid supply system 120 further includes one or more fracturing fluid pumps (not shown) that provide a motive force for supplying the conventional fracturing fluid and the density-tunable heavy fracturing fluid to the subsurface region 106.

It is within the scope of the present disclosure that the fracturing fluid supply system 120 may include one or more additional pipes, conduits, valves, controllers, and/or other fluid flow-control devices that may be incorporated into the fracturing fluid supply system 120 in any suitable manner. Such additional pipes, conduits, valves, controllers, and/or other fluid flow-control devices may be used to, for example, control and/or regulate the flow (or flow rates) of fluid streams, such as the slurries including the conventional fracturing fluid, the density-tunable heavy fracturing fluid, and/or the proppant, to the subsurface region 106.

Furthermore, in various embodiments, the hydrocarbon well 100 also includes the fracturing fluid recovery system 122, which is configured to recover at least a portion of the density-tunable heavy fracturing fluid from a slurry including the density-tunable heavy fracturing fluid and conventional fracturing fluid (as well as any residual proppant and/or other fluids) flowing back to the wellhead 114 after the stage 132 has been hydraulically fractured. In such embodiments, the fracturing fluid recovery system 122 may include any type(s) of separation device(s) that are configured to separate the density-tunable heavy fracturing fluid from the conventional fracturing fluid (and other fluids). For example, in some embodiments, the separation device(s) are configured to recover at least 60%, at least 70%, at least 80%, or at least 90% of the density-tunable heavy fracturing fluid that flows back to the wellhead 114. Moreover, because the slurry including the density-tunable heavy fracturing fluid is flowed into the fractures 104A, 104B, and 104C during the final part of the hydraulic fracturing process, a substantial portion of the density-tunable heavy fracturing fluid will flow back to the wellhead 114 during the initial flowback. For example, in some embodiments, at least 50%, at least 60%, or at least 70% of the total volume of density-tunable heavy fracturing fluid that is pumped into the wellbore 112 will return to the wellhead 114.

Moreover, in some embodiments, the fracturing fluid recovery system 122 includes a fracturing fluid reconditioning unit, which is configured to recondition the density-tunable heavy fracturing fluid (and/or the components thereof) for reuse within the wellbore 112 and/or another wellbore. According to embodiments described herein, capturing the density-tunable heavy fracturing fluid for reconditioning and reuse in this manner helps to increase the overall efficiency and cost-effectiveness of the hydraulic fracturing process.

The schematic views of FIGS. 1 and 2 are not intended to indicate that the hydrocarbon well 100 is to include all of the components shown in FIGS. 1 and 2, or that the hydrocarbon well 100 is limited to only the components shown in FIGS. 1 and 2. Rather, any number of components may be omitted from the hydrocarbon well 100 or added to the hydrocarbon well 100, depending on the details of the specific implementation. Moreover, those skilled in the art will appreciate that, while the hydrocarbon well 100 is depicted as including only one stage 102, this is for ease of illustration only. In practice, the hydrocarbon well 100 may include, for example, around 20 to 100 individual stages, with each stage including around 3 to 20 perforation clusters, where each perforation cluster typically includes a series of around 12 to 18 perforations extending over a 1-foot to 3-foot region, and where each zone is typically separated by around 10 to 100 feet along the length of the wellbore 112. Furthermore, those skilled in the art will appreciate that, while the hydrocarbon well 100 is depicted as including a vertical section and a horizontal section, the hydrocarbon well 100 may include any number of additional or alternative lateral, deviated, and/or highly-deviated sections extending in various directions throughout the subsurface region 106. In addition, in some embodiments, the wellhead 114 is a splitter-type wellhead that connects to a number of wellbores within the subsurface region 106.

Exemplary Properties of Density-Tunable Heavy Fracturing Fluid

The present techniques provide for the utilization of a novel density-tunable heavy fracturing fluid as a carrier fluid for efficiently propping a fractured subsurface region with proppant. Specifically, utilizing a relatively heavy (or high-density) fracturing fluid serves to reduce the settling velocity of the proppant within the fluid. In particular, because the settling rate (e.g., the settling velocity, as shown in expressions for both Stokes terminal settling velocity and Ferguson & Church settling velocity) of the proppant is proportional to the difference in density between the proppant and the carrier fluid, utilizing a heavier (e.g., higher-density) carrier fluid according to embodiments described herein enables the proppant to stay suspended for a longer period of time during the hydraulic fracturing process, thus increasing the overall fracturing potential for the process and extending the effective reach and/or depth for depositing the proppant within the resulting fractures. This concept is illustrated by equation (1), which may be used to determine the rate of settling (or settling velocity), v, for a proppant particle.

$$v = \frac{\rho_p - \rho_f}{18\eta} g\sigma^2, \quad (1)$$

In equation (1), $\rho_p - \rho_f$ is the density difference between the proppant particle and the carrier fluid; $\eta$ is the viscosity of the carrier fluid; g is the gravitational constant; and $\sigma^2$ is the square of the proppant particle diameter. As will be appreciated, proppant particles will settle at a slower rate as the density of the carrier fluid approaches the particle density and, accordingly, will also have better transport characteristics within such carrier fluid.

Turning now to exemplary details regarding the composition of the density-tunable heavy fracturing fluid described herein, such density-tunable heavy fracturing fluid includes one or more pseudo heavy fluid suspensions, one or more concentrated aqueous solutions of one or more soluble heavy compounds, and/or one or more high-density organic solutions. In particular, for embodiments in which the density-tunable heavy fracturing fluid includes one or more pseudo heavy fluid suspensions, such pseudo heavy fluid suspension(s) may include suspension(s) of fine particles, where such fine particles may be composed, at least in part, of ferrosilicon, magnetite, hematite, sand, barite, and/or galena, for example. In some embodiments, such fine particles include particle sizes roughly approximating that of silt, which has particle sizes within the range of around 0.002 millimeters (mm) to around 0.05 mm in diameter. Moreover, in such embodiments, the density of the pseudo heavy fluid suspension(s) may be between 1.25 g/ml and 3.4 g/ml. Furthermore, in such embodiments, the fine particles may be advantageously recovered from a slurry using gravity and/or magnetic separation techniques.

For embodiments in which the density-tunable heavy fracturing fluid includes one or more concentrated aqueous solutions of one or more soluble heavy compounds, such soluble heavy compound(s) may include, for example, one or more tungsten compounds. Examples of suitable tungsten compounds include, but are not limited to, sodium polytungstate (SPT), lithium heteropolytungstate (LST), and ammonium paratungstate (AMT). AMT, in particular, is a water-soluble tungstate compound that is an important precursor in the synthesis of many other tungsten compounds. Concentrated aqueous solutions of such tungsten compounds (and/or other suitable soluble heavy compounds) can have tunable densities of up to around 2.95 g/ml or even higher, depending on the concentrations. In addition, such concentrated aqueous solutions may have low viscosities. For example, LST has a viscosity of around 12 cP at 25° C., with the viscosity decreasing as temperature increases. Moreover, LST has high thermal stability, as demonstrated by testing at 140° C. for over two weeks with no observable change. Furthermore, such heavy-compound-based fluids (and, in particular, tungsten-based fluids) may have advantageously low toxicity levels.

For embodiments in which the density-tunable heavy fracturing fluid includes one or more high-density organic solutions, such high-density organic solution(s) may include, for example, bromoform, tetrabromoethane, and/or methylene iodide. However, those skilled in the art will appreciate that any other suitable organic solution with a density of around 1.25 g/ml or higher may additionally or alternatively be utilized.

Stated more generally, the density-tunable heavy fracturing fluid described herein may be a relatively-high-density fluid including fines, such as a pseudo heavy fluid suspension, or a relatively-high-density fluid that does not include fines, such as a concentrated aqueous solution of one or more soluble heavy compounds and/or an organic solution, or some combination thereof. As described herein, the utilization of such fluids (or any suitable combination thereof) provides a heavy fracturing fluid including a density that more closely approximates the density of the proppant as compared to conventional fracturing fluid and, thus, provides for more even and efficient placement of the proppant within the extended regions of the fractures for each stage of the wellbore.

Referring now to the general formulation of the density-tunable heavy fracturing fluid described herein, the density-tunable heavy fracturing fluid may be provided with a density of between around 1.25 g/ml and around 3.4 g/ml. According to embodiments described herein, the density of the density-tunable heavy fracturing fluid is specifically determined or selected based, at least in part, on the density of the proppant. For example, in some embodiments, the density of the density-tunable heavy fracturing fluid is selected to be within around 1.5 g/ml of the density of the proppant, although the exact density difference between the fracturing fluid and the proppant may vary depending on the details of the specific implementation. Moreover, in various embodiments, the density of the density-tunable heavy fracturing fluid is adjusted (or "tuned") to achieve a specified settling velocity for the proppant, with a lower density difference between the fracturing fluid and the proppant being selected to achieve a lower settling velocity for the proppant. In such embodiments, the settling velocity may be determined to ensure substantially even placement of the proppant within both the near-perforation region and the extended region of the fractures. In addition, in some embodiments, the density of the density-tunable heavy fracturing fluid is gradually increased to encourage the proppant to settle further and further from the wellbore within the extended region of the fractures.

Those skilled in the art will appreciate that the properties and characteristics of the density-tunable heavy fracturing fluid described herein will vary based on the particular combination of pseudo heavy fluid suspension(s), concentrated aqueous solution(s) of soluble heavy compound(s), and/or high-density organic solution(s) utilized to form the density-tunable heavy fracturing fluid. In some embodiments, this variability may be utilized to customize the properties of the density-tunable heavy fracturing fluid, such as, in particular, the density properties of the fluid, based on the details of the specific implementation.

Figure 3:
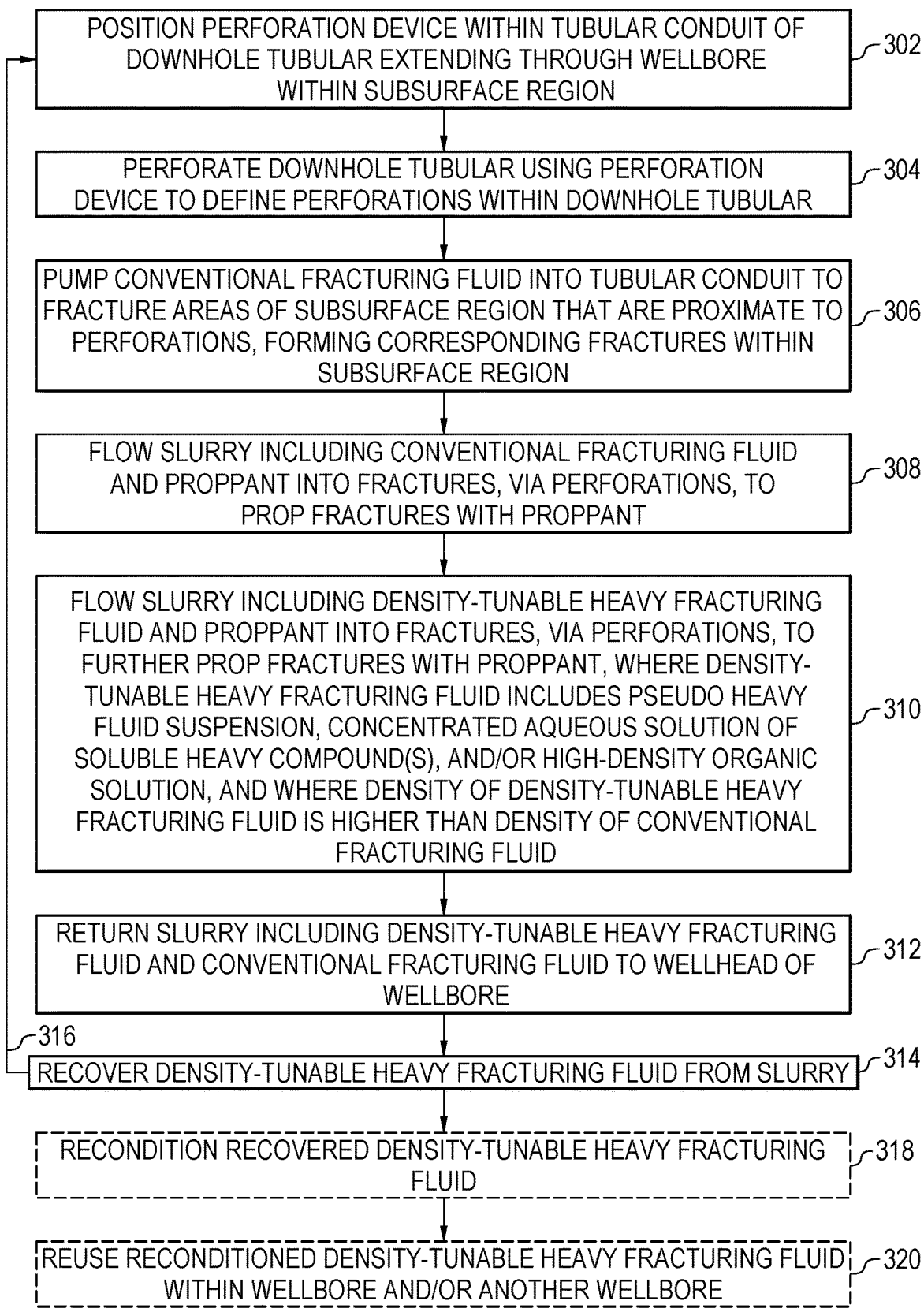
FIG. 3 is a process flow diagram of an exemplary method for completing a hydrocarbon well using the density-tunable heavy fracturing fluid described herein.

Method for Completing Hydrocarbon Well Using Density-Tunable Heavy Fracturing Fluid FIG. 3 is a process flow diagram of an exemplary method 300 for completing a hydrocarbon well (such as the exemplary hydrocarbon well 100 described with respect to FIGS. 1 and 2) using the density-tunable heavy fracturing fluid described herein. The method 300 begins at block 302, at which a perforation device is positioned within a tubular conduit of a downhole tubular extending through a wellbore within a subsurface region. This may be performed in any suitable manner. As an example, the perforation device may be flowed in a downhole direction and/or within a conveyance fluid stream that may be provided to the tubular conduit. As another example, an umbilical may be utilized to position the perforation device within the tubular conduit and/or to retain the perforation device within a target (or desired) region of the tubular conduit. As another example, the umbilical may be utilized to pull the perforation device in an uphole direction to position the perforation device within the tubular conduit and/or within the target region of the tubular conduit. Examples of a suitable umbilical for this purpose include a slickline, a wireline, coiled tubing, and/or a workover string.

At block 304, the downhole tubular is perforated using the perforation device to define (or create) perforations within the downhole tubular. This may be accomplished in any suitable manner. As an example, the perforation device may include and/or be a shaped charge perforation device that includes shaped charges. In this example, the downhole tubular may be perforated by igniting and/or discharging at least a subset of the shaped charges to form and/or define the perforations within the downhole tubular.

At block 306, conventional fracturing fluid is pumped into the tubular conduit to fracture areas of the subsurface region that are proximate to the perforations, forming corresponding fractures within the subsurface region. In some embodiments, this may include flowing the conventional fracturing fluid into the tubular conduit while sequentially increasing and decreasing the pumping rate, thus inducing a number of pressure cycles within the wellbore. Such pressure cycles, in turn, help to force the conventional fracturing fluid into the subsurface region via the perforations, locally pressurizing the subsurface region such that the fractures are formed within the subsurface region.

At block 308, a slurry including the conventional fracturing fluid and a proppant is flowed into at least a portion of the fractures, via the perforations, to prop the fractures with the proppant. In various embodiments, the propping at block 308 involves depositing the proppant within primarily the near-perforation region of the fractures. This is due, at least in part, to the relatively high settling velocity of the proppant within the conventional fracturing fluid.

Accordingly, at block 310, a slurry including the density-tunable heavy fracturing fluid described herein and the proppant is flowed into the fractures, via the perforations, to further prop the fractures with the proppant, where the density-tunable heavy fracturing fluid includes one or more pseudo heavy fluid suspensions, one or more concentrated aqueous solutions of one or more soluble heavy compounds, and/or one or more high-density organic solutions, and where the density of the density-tunable heavy fracturing fluid is higher than the density of the conventional fracturing fluid. As described herein, the propping at block 310 involves depositing the proppant within, not only the near-perforation region of the fractures, but also the extended region of the fractures. This is due, at least in part, to the lower settling velocity of the proppant within the density-tunable heavy fracturing fluid.

In some embodiments, block 310 further includes selecting the density of the density-tunable heavy fracturing fluid based, at least in part, on the density of the proppant. In such embodiments, block 310 may also include selecting the density of the density-tunable heavy fracturing fluid to be within 1.5 g/ml of the density of the proppant, within 1.0 g/ml of the density of the proppant, or within 0.5 g/ml of the density of the proppant, depending on the details of the particular implementation. In addition, in some embodiments, block 310 includes adjusting the density of the density-tunable heavy fracturing fluid to achieve a specified settling velocity for the proppant. In such embodiments, block 310 may also include gradually increasing the density of the density-tunable heavy fracturing fluid to encourage the proppant to settle further from the wellbore within the extended region of the fractures. Furthermore, in some embodiments, block 310 also includes providing the density-tunable heavy fracturing fluid with a density of between 1.25 g/ml and 3.4 g/ml.

At block 312, a slurry including the density-tunable heavy fracturing fluid and some amount of the conventional fracturing fluid is returned (or flowed back) to the wellhead of the wellbore. In various embodiments, this is accomplished by first allowing the hydraulic pressure within the wellbore to dissipate and then putting the hydrocarbon well onto production. As flowback begins, the first fluid flowing to the surface will be concentrated in the density-tunable heavy fracturing fluid, which was the last fluid pumped into the wellbore during the hydraulic fracturing process. Accordingly, the slurry flowing back from the wellbore will include a substantial portion of the density-tunable heavy fracturing fluid and some amount of the conventional fracturing fluid, as well as any residual proppant and/or other fluids from the wellbore.

At block 314, at least a portion of the density-tunable heavy fracturing fluid is recovered from the slurry. In some embodiments, this is accomplished by flowing the slurry through one or more separation devices that are configured to separate the density-tunable heavy fracturing fluid from the conventional fracturing fluid (as well as any residual proppant and/or other fluids). For example, for embodiments in which the density-tunable heavy fracturing fluid includes a pseudo heavy fluid suspension, this may be accomplished by utilizing one or more gravity and/or magnetic separation devices to separate the fine particles from the conventional fracturing fluid (and the residual proppant and/or other fluids). Moreover, in some embodiments, the residual proppant (if any) may not be separated from the density-tunable heavy fracturing fluid but, rather, may remain within the fracturing fluid until it is reused.

Moreover, as indicated by arrow 316, blocks 302-314 of the method 300 may be repeated any number of times. In various embodiments, this includes repeating blocks 302-314 for each stage of the hydrocarbon well (or for at least a portion of such stages) as the hydraulic fracturing operation progresses.

Furthermore, at optional block 318, the recovered density-tunable heavy fracturing fluid may be reconditioned. For example, if the slurry flowing back from the wellbore includes around 90% density-tunable heavy fracturing fluid and around 10% conventional fracturing fluid, the recovered density-tunable heavy fracturing fluid may be diluted. Therefore, fine particles (and/or other solids or fluids) may be added back into the density-tunable heavy fracturing fluid during reconditioning to render the density-tunable heavy fracturing fluid suitable for reuse. Moreover, after such reconditioning, the reconditioned density-tunable heavy fracturing fluid may be reused within the wellbore and/or another wellbore at optional block 320.

The process flow diagram of FIG. 3 is not intended to indicate that the steps of the method 300 are to be executed in any particular order, or that all of the steps of the method 300 are to be included in every case. Further, any number of additional steps not shown in FIG. 3 may be included within the method 300, depending on the details of the specific implementation. As an example, in some embodiments, the method 300 includes formulating the density-tunable heavy fracturing fluid based, at least in part, on expected or measured downhole conditions within the subsurface region.

Embodiments of Present Techniques

In one or more embodiments, the present techniques may be susceptible to various modifications and alternative forms, such as the following embodiments as noted in paragraphs 1 to 20.

Paragraph 1. A method for completing a hydrocarbon well using a density-tunable heavy fracturing fluid, the method including: positioning a perforation device within a tubular conduit of a downhole tubular extending through a wellbore within a subsurface region; perforating the downhole tubular using the perforation device to define perforations within the downhole tubular; pumping a conventional fracturing fluid into the tubular conduit to fracture areas of the subsurface region that are proximate to the perforations, forming corresponding fractures within the subsurface region; and flowing a slurry including the conventional fracturing fluid and a proppant into the fractures, via the perforations, to prop the fractures with the proppant; flowing a slurry including a density-tunable heavy fracturing fluid and the proppant into the fractures, via the perforations, to further prop the fractures with the proppant, wherein the density-tunable heavy fracturing fluid includes at least one of a pseudo heavy fluid suspension, a concentrated aqueous solution of a soluble heavy compound, or a high-density organic solution, and wherein a density of the density-tunable heavy fracturing fluid is higher than a density of the conventional fracturing fluid; returning a slurry including the density-tunable heavy fracturing fluid and the conventional fracturing fluid to a wellhead of the wellbore; and recovering at least a portion of the density-tunable heavy fracturing fluid from the slurry.

Paragraph 2. The method of paragraph 1, further including selecting the density of the density-tunable heavy fracturing fluid based, at least in part, on the density of the proppant.

Paragraph 3. The method of paragraph 2, including selecting the density of the density-tunable heavy fracturing fluid to be within 1.5 grams/milliliter (g/ml) of the density of the proppant.

Paragraph 4. The method of any of paragraphs 1 to 3, wherein flowing the slurry including the density-tunable heavy fracturing fluid and the proppant into the fractures further includes adjusting the density of the density-tunable heavy fracturing fluid to achieve a specified settling velocity for the proppant.

Paragraph 5. The method of paragraph 4, wherein adjusting the density of the density-tunable heavy fracturing fluid comprises gradually increasing the density of the density-tunable heavy fracturing fluid to encourage the proppant to settle further from the wellbore within an extended region of the fractures.

Paragraph 6. The method of any of paragraphs 1 to 5, including providing the density-tunable heavy fracturing fluid with a density of between 1.25 grams/milliliter (g/ml) and 3.4 g/ml.

Paragraph 7. The method of any of paragraphs 1 to 6, wherein recovering at least the portion of the density-tunable heavy fracturing fluid from the slurry includes flowing the slurry through a separation device that is configured to separate the density-tunable heavy fracturing fluid from the conventional fracturing fluid.

Paragraph 8. The method of any of paragraphs 1 to 7, further including: reconditioning the recovered density-tunable heavy fracturing fluid; and reusing the reconditioned density-tunable heavy fracturing fluid within at least one of the wellbore or another wellbore.

Paragraph 9. The method of any of paragraphs 1 to 8, wherein the pseudo heavy fluid suspension includes a suspension of fine particles, and wherein the fine particles include at least one of ferrosilicon, magnetite, hematite, sand, barite, or galena.

Paragraph 10. The method of any of paragraphs 1 to 9, wherein the soluble heavy compound within the concentrated aqueous solution comprises a tungsten compound.

Paragraph 11. The method of paragraph 10, where the tungsten compound comprises at least one of sodium polytungstate (SPT), lithium heteropolytungstate (LST), or ammonium paratungstate (AMT).

Paragraph 12. The method of any of paragraphs 1 to 11, wherein the high-density organic solution comprises at least one of bromoform, tetrabromoethane, or methylene iodide.

Paragraph 13. The method of any of paragraphs 1 to 12, further including formulating the density-tunable heavy fracturing fluid based, at least in part, on expected or measured downhole conditions within the subsurface region.

Paragraph 14. The method of any of paragraphs 1 to 13, including performing the method for each stage of the wellbore.

Paragraph 15. The slurry for propping fractures within a subsurface region, wherein the slurry includes: a proppant; and a density-tunable heavy fracturing fluid including at least one of a pseudo heavy fluid suspension, a concentrated aqueous solution of a soluble heavy compound, or a high-density organic solution; wherein a density of the density-tunable heavy fracturing fluid is between 1.25 grams/milliliter (g/ml) and 3.4 g/ml; and wherein the density of the density-tunable heavy fracturing fluid is selected based on a density of the proppant.

Paragraph 16. The slurry of paragraph 15, wherein the pseudo heavy fluid suspension includes a suspension of fine particles, and wherein the fine particles include at least one of ferrosilicon, magnetite, hematite, sand, barite, or galena.

Paragraph 17. The slurry of paragraph 15 or 16, wherein the soluble heavy compound within the concentrated aqueous solution comprises a tungsten compound, and wherein the tungsten compound comprises at least one of sodium polytungstate (SPT), lithium heteropolytungstate (LST), or ammonium paratungstate (AMT).

Paragraph 18. The slurry of any of paragraphs 15 to 17, wherein the high-density organic solution comprises at least one of bromoform, tetrabromoethane, or methylene iodide.

Paragraph 19. The slurry of any of paragraphs 15 to 18, wherein the density of the density-tunable heavy fracturing fluid is selected to be within 1.5 g/ml of the density of the proppant.

Paragraph 20. The slurry of any of paragraphs 15 to 19, wherein the proppant includes at least one of sand, ceramic particles, petroleum coke particles, a polyolefin, or a polyaromatic hydrocarbon resin.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present techniques may be modified and practiced in different but equivalent manners apparent to those skilled in the art having the benefit of the teachings herein. Furthermore, no limitations are intended on the details of formulation, construction, or design herein shown, other than as described in the claims below. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present techniques include all alternatives, modifications, and equivalents falling within the true spirit and scope of the appended claims.

What is claimed is:

1. A method for completing a hydrocarbon well using a density-tunable heavy fracturing fluid, the method comprising:
   positioning a perforation device within a tubular conduit of a downhole tubular extending through a wellbore within a subsurface region, wherein the perforation device is positioned within the tubular conduit at a location of a particular stage of the wellbore;
   perforating the downhole tubular using the perforation device to define perforations within the downhole tubular;
   pumping a conventional fracturing fluid into the tubular conduit to fracture areas of the subsurface region that are proximate to the perforations, forming corresponding fractures within the subsurface region, wherein the conventional fracturing fluid has a density of 1.2 grams/milliliter (g/ml) or less;
   flowing a slurry comprising the conventional fracturing fluid and a proppant into the fractures, via the perforations, to prop the fractures with the proppant;
   flowing a slurry comprising a density-tunable heavy fracturing fluid and the proppant into the fractures, via the perforations, to further prop the fractures with the proppant, wherein the density-tunable heavy fracturing fluid comprises at least one of a pseudo heavy fluid suspension, a concentrated aqueous solution of a soluble heavy compound, or a high-density organic solution, and wherein a density of the density-tunable heavy fracturing fluid is higher than a density of the conventional fracturing fluid;
   returning a slurry comprising the density-tunable heavy fracturing fluid and the conventional fracturing fluid to a wellhead of the wellbore; and
   recovering at least a portion of the density-tunable heavy fracturing fluid from the slurry; and
   wherein the wellbore comprises at least one additional stage; and
   wherein the method further comprises repeating the method for each stage of the wellbore.

2. The method of claim 1, further comprising selecting the density of the density-tunable heavy fracturing fluid based, at least in part, on the density of the proppant.

3. The method of claim 2, comprising selecting the density of the density-tunable heavy fracturing fluid to be within 1.5 grams/milliliter (g/ml) of the density of the proppant.

4. The method of claim 1, wherein flowing the slurry comprising the density-tunable heavy fracturing fluid and the proppant into the fractures further comprises adjusting the density of the density-tunable heavy fracturing fluid to achieve a specified settling velocity for the proppant.

5. The method of claim 4, wherein adjusting the density of the density-tunable heavy fracturing fluid comprises increasing the density of the density-tunable heavy fracturing fluid to encourage the proppant to settle further from the wellbore within an extended region of the fractures.

6. The method of claim 1, comprising providing the density-tunable heavy fracturing fluid with a density of between 1.25 grams/milliliter (g/ml) and 3.4 g/ml.

7. The method of claim 1, wherein the density-tunable heavy fracturing fluid comprises the pseudo heavy fluid suspension, and wherein recovering at least the portion of the density-tunable heavy fracturing fluid from the slurry comprises flowing the slurry through a separation device that is configured to separate the density-tunable heavy fracturing fluid from the conventional fracturing fluid.

8. The method of claim 1, further comprising:
   reconditioning the recovered density-tunable heavy fracturing fluid; and
   reusing the reconditioned density-tunable heavy fracturing fluid within at least one of the wellbore or another wellbore.

9. The method of claim 1, wherein the density-tunable heavy fracturing fluid comprises at least the pseudo heavy fluid suspension, wherein the pseudo heavy fluid suspension comprises a suspension of fine particles, wherein the fine particles comprise a particle size within a range of 0.002 millimeters (mm) to 0.05 mm in diameter, and wherein the fine particles comprise at least one of ferrosilicon, magnetite, hematite, sand, barite, or galena.

10. The method of claim 1, wherein the density-tunable heavy fracturing fluid comprises at least the concentrated aqueous solution of the soluble heavy compound, and wherein the soluble heavy compound within the concentrated aqueous solution comprises a tungsten compound.

11. The method of claim 10, where the tungsten compound comprises at least one of sodium polytungstate (SPT), lithium heteropolytungstate (LST), or ammonium paratungstate (AMT).

12. The method of claim 1, wherein the density-tunable heavy fracturing fluid comprises at least the high-density organic solution, and wherein the high-density organic solution comprises at least one of bromoform, tetrabromoethane, or methylene iodide.

* * * * *